(12) United States Patent
Visser et al.

(10) Patent No.: US 9,304,300 B2
(45) Date of Patent: Apr. 5, 2016

(54) ANAMORPHOTIC TELESCOPE

(75) Inventors: Huibert Visser, Delft (NL); Borgert Kruizinga, Delft (NL); Michiel David Nijkerk, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 202 days.

(21) Appl. No.: 13/816,531

(22) PCT Filed: Aug. 12, 2011

(86) PCT No.: PCT/NL2011/050562
§ 371 (c)(1),
(2), (4) Date: Mar. 15, 2013

(87) PCT Pub. No.: WO2012/021063
PCT Pub. Date: Feb. 16, 2012

(65) Prior Publication Data
US 2013/0293885 A1    Nov. 7, 2013

(30) Foreign Application Priority Data

Aug. 12, 2010 (EP) .................................. 10172704

(51) Int. Cl.
*G01J 3/28* (2006.01)
*G02B 13/12* (2006.01)
(Continued)

(52) U.S. Cl.
CPC ............ *G02B 13/12* (2013.01); *G02B 17/0621* (2013.01); *G02B 23/06* (2013.01); *G02B 13/08* (2013.01)

(58) Field of Classification Search
CPC ............... G02B 27/0911; G02B 12/12; G02B 17/0621; G02B 13/12; G02B 17/0605; G02B 17/0615
USPC .................................. 359/857, 858, 868, 869
See application file for complete search history.

(56) References Cited

U.S. PATENT DOCUMENTS 3,502,387 A * 3/1970 Long et al. ..................... 348/336
3,521,957 A * 7/1970 Uri et al. ........................ 356/305
(Continued)

OTHER PUBLICATIONS

Jun Chang et al., "Optical System Design with High Resolution and Large Field of View for the Remote Sensor", Key Engineering Materials vols. 364-366 (2008) pp. 550-554, Trans Tech Publications, Switzerland.
(Continued)

*Primary Examiner* — Michael A Lyons
*Assistant Examiner* — Dominic J Bologna
(74) *Attorney, Agent, or Firm* — Banner & Witcoff, Ltd.

(57) ABSTRACT

An anamorphotic telescope has mutually different magnification along directions of minimum and maximum magnification in an image plane. A spectroscope with an elongated input slit directed along one of the directions of maximum and minimum magnification may be located in the image plane. The anamorphotic telescope has a first and second reflector lens with mutually different first and second radii of curvature in directions (y, x) that optically correspond to directions of minimum and maximum magnification. At least one of the first and second reflector lens has a variable radius of curvature in one direction (x), which varies as a function of position in the other direction (y), the variable radius of curvature decreasing in a direction of the angle from the view direction to the light directed by the first reflector lens to the second reflector lens.

15 Claims, 7 Drawing Sheets

(51) Int. Cl.
*G02B 17/06* (2006.01)
*G02B 23/06* (2006.01)
*G02B 13/08* (2006.01)

(56) References Cited

U.S. PATENT DOCUMENTS

| | | | |
|---|---|---|---|
| 4,060,327 A * | 11/1977 | Jacobowitz et al. | 356/328 |
| 5,841,575 A | 11/1998 | Visser et al. | |
| 6,022,114 A | 2/2000 | Foo | |
| 6,734,966 B2 * | 5/2004 | McCarthy | 356/328 |
| 2003/0147163 A1 | 8/2003 | Yoshikawa et al. | |

OTHER PUBLICATIONS

International Search Report—PCT/NL2011/050562—Mailing date: Sep. 21, 2011.

\* cited by examiner

ANAMORPHOTIC TELESCOPE

CROSS-REFERENCE TO RELATED APPLICATIONS

This application is a U.S. National Stage application under 35 U.S.C. §371 of International Application PCT/NL2011/050562 (published as WO 2012/021063 Al), filed Aug. 12, 2011, which claims priority to Application EP 10172704.8, filed Aug. 12, 2010. Benefit of the filing date of each of these prior applications is hereby claimed. Each of these prior applications is hereby incorporated by reference in its entirety.

FIELD OF THE INVENTION

The invention relates to an anamorphotic telescope and to a telescopic spectroscope.

BACKGROUND

As is well known, a telescope is an optical device that is designed to form images of far-off objects. A telescope may be constructed from a primary reflector lens that collects and focuses incoming light and one or more secondary lenses that use the collected light to form an image. For such a telescope high spatial resolution, i.e. small spot size is desirable property.

In a telescopic spectroscope, the telescope contains a spectrometer with an input slit located to receive light for spectroscopic analysis from the image plane of the spectroscope, so that spectra can be measured for selectable image plane locations or regions of image plane locations. Spectra may be obtained simultaneously for different locations on a line of locations in the image plane along the length of the opening slit of the spectrometer (in parallel with the lines of the grating, if a grating is used in the spectrometer). In a satellite, or other moving platform, this line is preferably directed transverse to the direction of travel of the platform, so that there is no need for detection at different image plane locations in a direction transverse to the line, because object points imaged at these locations will be imaged on the slit at another time points as a result of movement of the telescopic spectroscope. A large field of view along this line makes it possible to obtain spectra for a wide strip of locations. For such a telescopic spectroscope, high spatial resolution along the line is desirable property.

It may be desirable to minimize the number of lenses in a telescope. For example, it may be desirable to reduce the weight of telescopes for space applications, but it may be desirable to minimize the number of lenses also for other reasons.

U.S. Pat. No. 5,841,575 describes a telescope that requires only two concave reflector lenses. A first reflector lens collects incoming light and forms a virtual image between it and a second reflector lens. The second reflector lens images the virtual image in a final image plane, where a spectrometer receives the resulting light. The first reflector lens reflects the light off-axis towards a second reflector lens: the incoming and outgoing optical axis are at an angle to each other, so that the second reflector lens does not obstruct the incoming rays of the first reflector lens.

An aperture stop is included between the two reflector lenses. The distance between the aperture stop and the second reflector lens corresponds to the focal distance of the second reflector lens. This has the effect that central rays of the light at different positions on the final image plane are parallel, or in other words, that the telescope is telecentric. The document mentions that reflectors with spherical surfaces are preferred, but that aspherically shaped surfaces are also possible.

An additional advantageous effect of the aperture stop, not mentioned in this document, is that it reduces optical aberrations of the telescope such as spherical aberration, coma and, to a limited extent, astigmatism. The aperture stop reduces the range of angles of rays from the first reflector lens that contribute to the final image. Typically, aberrations are proportional to the size of this range and hence the aperture stop reduces the aberrations.

U.S. Pat. No. 5,841,575 describes that the resulting telescope has a large field of vision. An example of ninety degrees is mentioned. However, the spot size at the edge of the field of vision has been found to be quite poor.

It has been known to realize telescopes that have different magnification along different directions in the image plane. Such a telescope is called an anamorphotic telescope. Typically an image plane direction of maximum magnification and an image plane direction of minimum magnification can be defined in an anamorphotic telescope. By tracing back along the optical path through the telescope, corresponding directions of maximum and minimum magnification can be identified everywhere along the optical path. A vector between a pair of image points is magnified according to the different magnifications of its components along the directions of maximum and minimum magnification, at least in the limit of image points near the optical axis (called the paraxial limit).

An anamorphotic telescope may be realized for example by using lenses that each have mutually different focal distances for object lines transverse to the different magnification directions respectively. These lenses can be placed at such a distance that a first lens images the object lines at different intermediate virtual image surfaces between the lenses, and that a second lens images the object lines from the different virtual image surfaces to the same final image plane. This has the effect that the magnification of the object lines in the different directions onto the final image plane will be different.

A lens that has mutually different focal distances for object lines in the different directions can be realized by means of a lens surface that has mutually different radii of curvature in the directions of minimum and maximum magnification, as traced back along the optical path. Each lens may have a basic toroidal shape, optionally with small deviations from a perfect toroidal shape.

SUMMARY

Among others, it is an object to provide for better image quality in combination with a large field of vision for an anamorphotic telescope.

In an embodiment wherein the anamorphotic telescope is used in a telescopic spectroscope, spectra may be obtained simultaneously for different locations along an opening slit of the spectrometer, that is, along a line of locations in the image plane of the anamorphotic telescope. For the telescopic spectroscope it is an object, among others, to provide for a large field of vision with high spatial resolution in the direction along said line.

An anamorphotic telescope is provided. The anamorphotic telescope has a first and second reflector lens, with incoming light reaching the first reflector lens at a non zero incidence angle to the optical axis between the first and second reflector lens. The anamorphotic telescope may be designed starting from the desired distance between the first and second reflector lens, the angle of incidence and the desired magnifications in a first and second direction (y, x). From this the basic radii of curvature of the first and second reflector lens along the first and second direction (y, x) may be selected. The first and second directions (y, x) correspond to respective ones of the directions of minimum and maximum magnification, and they are aligned with and perpendicular to the direction in which the angle of incidence deviates from the optical axis between the reflector lenses. The positive (+y) and negative polarity (−y) in the first direction are defined so that the y component of vectors from points along the direction of incidence to points on the optical axis is negative (−y) or, in other words that rotation of the direction of incidence to the direction of the optical axis results in displacement with a negative y component. The first and second directions (y, x) may be defined in the final image plane, corresponding to the direction of the angle of incidence (the direction of shortest diameter of the opening slit of the spectrometer in the telescopic spectroscope) and the direction transverse to it, and by tracing back from the final image plane along the optical path to the reflector lenses. In the telescopic spectroscope, the optical axis between the reflector lenses may be defined by tracing back to the imaged object along the optical path from the centre of the opening slit of the spectrometer.

It has been found that use of anamorphotism makes it possible to realize a telescope that provides for better spot size over a wide field of view along at least one direction than a conventional telescope with equal magnifications. Anamorphotic imaging provides for mutually different magnifications along directions of minimal and maximal magnification in the final image plane of the anamorphotic telescope. A ratio Q of two between these magnifications may be used for example. The ratio Q may be chosen to optimize this effect. Furthermore it has been found that a significantly improved spot size can be obtained especially when the radius of curvature Rx in the second direction of at least one of the first and second reflector lenses is made to vary with position on the reflector lens along the first direction (y).

The second radius of curvature Rx decreases in a (−y) direction, away from the (+y) direction in which the angle of incidence deviates from the optical axis between the reflector lenses. In other words, the second radius of curvature Rx decreases in the direction of the first direction component of displacement from points along the view direction to points along a path of the light directed by the first reflector lens to the second reflector lens; or in terms of an arc of the angle of rotation between the view direction to the direction of light directed by the first reflector lens to the second reflector lens, the variable radius of curvature decreases in a direction of the arc from the view direction to the light directed by the first reflector lens to the second reflector lens. In the case of the first reflector lens, the second radius of curvature Rx decreases in the direction that corresponds to the first direction component of the displacement vectors from points in the view direction towards points on the optical axis.

In an embodiment the decrease of the second radius of curvature Rx is selected according to $$1/Rx = 1/Rxo(1 + ade^*ay^*(0.26225^*Q^{-0.05} - 0.27311) Rxo^2/(Mx^*Ry))$$

This has been found to optimize the improvement of spot size. Herein Q=My/Mx is a ratio between magnifications Mx and My of the anamorphotic telescope in the second and first directions, defined as distance in the image plane per radian object direction difference, Rxo is a basic constant radius of curvature necessary for imaging in the image plane, Ry is the radius of curvature in the first direction, "ade" is the angle of the direction of incidence in degrees and ay is an angle (in radians) between the optical axis between the first and second reflector lens and a line from a centre of the curvature of the first reflector lens in the first direction and a point on the first reflector lens for which the radius of curvature is defined.

Although a varying curvature according to this formula provides an optimal result, it should be appreciated that different curvature variations, with values near those specified by the formula, may also provide for improved spot size. For example, improved results may also be obtained with inverse curvature values 1/Rx as a function of ay in a range between $$1/Rxo(1 + (1-F)^*ade^*ay^*(0.26225^*Q^{-0.05} - 0.27311) Rxo^2/(Mx^*Ry)) \text{ and}$$

$$1/Rxo(1 + (1+F)^*ade^*ay^*(0.26225^*Q^{-0.05} - 0.27311) Rxo^2/(Mx^*Ry)).$$

Herein F is a range factor. When F approaches zero a range containing only the optimal value is obtained. In an embodiment improved results are obtained when the inverse curvatures are within a range defined by F=1, more improved results may be obtained when the inverse curvatures are within a range defined by F=0.9 and yet more improved results may be obtained when the inverse curvatures are within a range defined by F=0.5 or even 0.1.

Mutually different first and second radii of curvature of the first reflector lens in the first and second direction and mutually different first and second radii of curvature of the second reflector lens are used to make anamorphotic imaging possible. The directions in which the first and second reflector lens are curved according to the first and second radii of curvature (corresponding to different ones of the directions of minimum and maximum curvature of a toroidal shape). In the telescopic spectroscope, the direction of curvature according to the second radius of curvature corresponds to the direction of the line of different image locations for which the spectra are determined in parallel.

In an embodiment the second radius of curvature of only one of the reflector lenses varies with position. In a further embodiment this is one of the first and the second reflector lenses that is closest to the virtual images between the first and second reflector lens. In an embodiment the second radius of curvature varies only in the first reflector lens, the lens that receives the incoming light and forms the intermediate images. At large magnifications this is typically the lens closest to the intermediate image plane.

Even without the variable radius of curvature, adjustment of the anamorphotic ratio Q to values different from one, (e.g. greater than 1.2) already makes it possible to realize a smaller spot size over a large field of view when the telescope used only a line shaped part of the image, which has a large field of view in only one direction as is the case when a spectrometer with a line shaped opening in the image plane is used, or a linear array sensor for example in a push broom telescope, wherein the length of the array extends transverse (e.g. perpendicular) to the direction of movement, etc. Optimum results can be achieved when a direction of maximum or minimum magnification is aligned with the line shaped part of the image. The variable radius of curvature may be used to realize a significant further reduction of the spot size in this case.

In an embodiment the telescope comprises an aperture stop located between the first and second reflector lens at a distance from the second reflector lens that equals a focus distance of the second reflector lens for object lines that extend along the one of the first and second direction. In this way the telescope is made telecentric for imaging object lines in that direction. Preferably a centre of the aperture stop coincides with the optical axis. When combined with a spectroscope that is configured to derive respective spectra for different image positions along a line the telescope is preferably telecentric for the focus distance defined by the second radius of the second reflector lens. This makes it possible to realize high spectral resolution with a relatively small telescope.

In an embodiment the magnification in the length direction of the opening slit of the spectrometer is made smaller than the magnification in the narrowest direction of the opening slit. In this way a higher spectral resolution can be realized with high spatial resolution in the object direction corresponding to the narrowest direction.

BRIEF DESCRIPTION OF THE DRAWING

These and other object and advantageous aspects will become apparent from a description of exemplary embodiments with reference to the following figures.

DETAILED DESCRIPTION OF EXEMPLARY EMBODIMENTS

Anamorphotic Telescope with Two Toroidal Reflector Lenses

In the following an example of an anamorphotic telescope will be described in the context of an application to spectroscopy, wherein spectra are determined simultaneously for light from a series of azimuth angles at a fixed elevation angle from the telescope. The telescope may be mounted on a platform in a satellite, so that series of azimuth angles at the fixed elevation corresponds to angles directed at a line on the earth's surface, movement of the satellite sweeping the line over the surface transverse to its direction. This type of telescope is sometimes referred to as a "push-broom" telescope. However, it should be appreciated that in other embodiments the anamorphotic telescope with a wide field of view can be applied also without a spectroscope.

Figure 1:
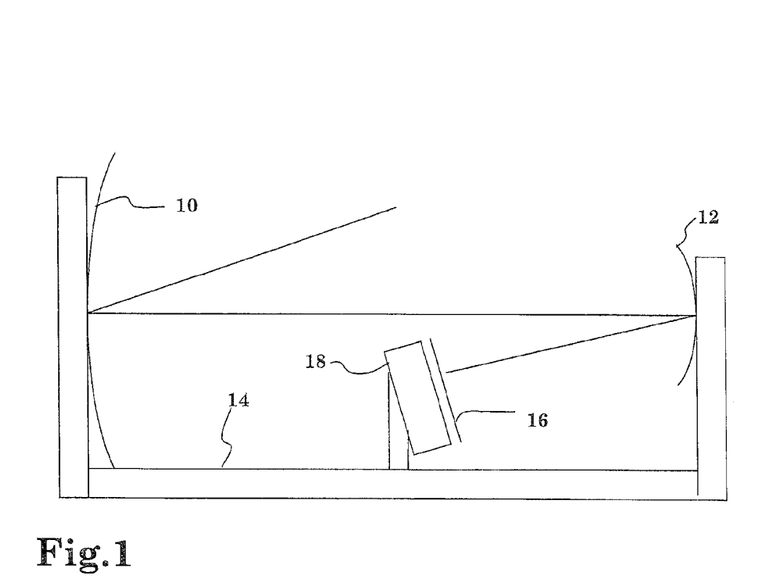
FIG. 1 shows a telescopic spectroscope

FIG. 1 shows a telescopic spectroscope with an anamorphotic telescope. The telescope has only two reflector lenses 10, 12: a first reflector lens 10 and a second reflector lens 12 mounted in fixed relation to each other on a frame 14. Frame 14 may be mounted on a movable platform in a satellite or other vehicle (not shown). The telescope comprises first and second reflector lens 10, 12, the frame 14, an image plane aperture with an elongated slit 16 directed with its longest direction perpendicular to the plane of the drawing and a spectroscope 18. The image plane aperture with slit 16 is mounted in an image plane of the telescope. The image plane aperture may be part of spectroscope 18, slit 16 being defined by the input opening of spectroscope 18. Spectroscope 18 is mounted optically behind the image plane aperture. In operation an image is formed at slit 16, and spectroscope 18 spectrally resolves imaged light that passes through slit 16.

The telescope will be described in terms of an xyz coordinate system that is defined by x and y axes in the image plane and a z-axis perpendicular to the image plane and corresponding xyz axes that are obtained by tracing back from the image plane along the optical path. This correspondence may involve redirection of the xyz axes relative to those at the image plane due to reflection at the first and second reflector lenses 10, 12. In the example, the difference between the directions of the xyz axis at different positions along the optical path are small. To avoid complicating the description the part of the optical path to which the xyz directions relate will not be specified where this does not lead to confusion.

The ray path of a ray that travels along the optical axis lies in the yz-plane of this coordinate system (x=0). The part of this ray path between reflector lenses 10, 12 runs along the z-axis of this coordinate system (x=0 and y=0).

The anamorphotic telescope has an oblique angle of incidence. The incident optical axis on first reflector lens 10 and from second reflector lens 12 to slit 16 deviate from the z-axis between the first and second reflector lens 10, 12, to avoid interception of light between first and second reflector lens 10, 12. Accordingly the normal of the plane of the image plane aperture slightly deviates from the z-axis between first and second reflector lens 10, 12. However, for the sake of explanation this deviation will be ignored where it does not lead to confusion.

Slit 16 has an elongated shape, for example a rectangular shape or a rectangular shape with rounded corners, with its longest extent along the x-direction and its smallest extent along the y direction. In an embodiment slit 16 may be between 10 and 100 millimeter long in the x-direction and between 0.1 and 1 millimeter wide in the y-direction, for example 64 millimeter long and 0.28 millimeter wide. In an embodiment this corresponds to a field of view of 108 degrees in the x-direction and a field of view of 0.24 degrees in the y-direction, when a magnification of 0.6 millimeter per degree in the x-direction is used and an anamorphotic ratio of 2 (1.2 millimeter per degree in the y-direction).

Spectroscope 18 produces a range of spectrograms, each for positions with a respective x-coordinate along slit 16. Each spectrogram is obtained from light imaged along a range of y-coordinates. Spectroscope 18 resolves wavelengths as a function of y-coordinate. Thus, spectroscope 18 outputs an image with x and y coordinates, wherein the intensity at an image position with coordinates x,y corresponds to spectral intensity at a wavelength defined by the y coordinate value of light at an angle of incidence on the telescope in the xz plane. Components at different angle of incidence on the telescope in the yz plane are effectively summed.

Spectroscope 18 may comprise a grating with grating lines that run parallel to the longitudinal direction of slit 16 (the x direction), configured so that light from the entire height of slit 16 is applied to the grating. Spectroscope 18 may comprise a collimator, a grating, an imaging objective and a camera successively along the optical path from slit 16. The distance between slit 16 and the collimator equals the focus distance of the collimator. The collimator applies collimated light from slit 16 to the grating and the imaging objective images diffracted light from the grating onto the camera, so that light from different positions along the longest direction of slit 16 is imaged at different positions on the camera. FIG. 1 shows a cross-section of the telescope in the yz-plane (the plane of the ray path of a ray along the optical axis, i.e. the main symmetry plane relative to which reflector lenses have mirror symmetry). Ray path 19 ends at the centre of slit 16. First objective lens 10 is tilted with respect to the part of ray path between first and second reflector lens 10, 12 (the z axis). As a result the ray path 19 of the ray along the optical axis is incident from the object (not shown) at an angle (which will be called "ade") to the z-axis. An angle ade of about four degrees may be used for example.

The focus distances of first reflector lens 10 and second reflector lens 12 and the distance between these lenses 10, 12 are selected so that a virtual image is formed between reflector lenses 10, 12. First reflector lens 10 images an object line at infinity onto a virtual image surface located between first reflector lens 10 and second reflector lens 12. Second reflector lens 12 images the object line in this virtual image plane onto a final image plane. Slit 16 is located in the final image plane.

The telescope is anamorphotic, that is, it is designed to provide for different magnification in the x and y directions. In an embodiment a ratio of two is used between the magnifications in the x and y directions. Thus, isotropic shapes (such as circles) in an object plane will be deformed into elongated shapes (such as ellipses) in the image plane, the extent in the y direction being expanded relative to the extent in the x direction at slit 18. To realize anamorphotism, the basic shape of first and second reflector lenses 10, 12 is toroidal. That is, first and second reflector lens 10, 12 each have mutually different radii of curvature in cross-sections with the xz plane and in the yx plane respectively. Thus, first and second reflector lens 10, each have different focal distances for a bundle of rays at a common angle of incidence in the xz plane and a bundle of rays at a common angle of incidence in the yx plane respectively.

Due to the different radii of curvature, the reflector lenses lack continuous rotation symmetry under rotation around the optical axis (the z-axis). Each reflector lens may be symmetric when mirrored with respect to a main symmetry plane through the yz plane (the main symmetry plane that contains the ray path 19 of the ray along optical axis of the telescope). The main surface directions of the reflector lenses 10, 12 may be defined in terms of the main symmetry plane: a first direction (y) along which the surface intersects the main symmetry plane and a second direction (x) transverse to the main symmetry plane. The first radius of curvature of the surface of the reflector lenses in the first direction differs from the second radius of curvature in the second direction.

First reflector lens 10 forms virtual images between first and second reflector lens 10, 12. Use of a first reflector lens 10 with toroidal basic shape with different radii of curvature in the first and second direction has the effect that the virtual images of object lines that extend in an yz-plane (constant x) substantially in the y direction and object lines that extend in an xz plane (constant y) substantially in the x direction are located on different virtual image surfaces between first reflector lens 10 and second reflector lens 12. For image points on the optical axis and object lines at infinity these virtual image surfaces define a first and second focal distance Fy1 and Fx1 of first reflector lens 10 in the first and second direction respectively. For image points on the optical axis, second reflector lens 12 has a first and second focal distance Fy2 and Fx2 in the first and second direction respectively. The focal distances Fx1, Fx2 determine imaging as a function of x-position along slit 16. The focal distances Fy1, Fy2 determine imaging as a function of y-position along slit 16. The focal distances are selected so that images of all object lines are focussed in the same final image plane.

The magnification factor Mx in the x direction of the image (for imaging of object lines that extend in the y direction) is proportional to $D2*Fx1/(D1-Fx1)$, where D1 is the distance D1 between the first and second reflector lens 10, 12. The distance D1 is selected so that object lines in both direction are images on the same final image plane (at slit 18), at a distance D2 from second reflector lens. In the limit of a small field of view and a small image, this would impose the condition $1/(D1-Fx1)+1/D2=1/Fx2$. This relation also relates the radii of curvature: Fx1, Fx2 are equal half the radii of curvature Rx1, Rx2 of the first and second reflector lenses 10, 12 in the second direction. For a larger field of view in the case of a telecentric telescope, the condition relating to the focus distances in the second direction (x) is that $$D1=2*\sin(-0.5*\arctg(H/Fx2)+0.25*W)*Fx2*\sqrt{1+(H/Fx2)^2)}*Fx1/H+(Fx2+2*Fx1)$$

Herein W is the field of view angle and H is the half height of slit 16.

Similar relations hold for the focus distances in the second direction. A degree of anamorphotism Q is selected, which is the ratio Q=My/Mx between the magnification factors for imaging as a function of y and x position. In an embodiment a ratio Q=2 is used. From the ratio Q, the radii of curvature in the y direction are determined. For small angles the equations Ay=D2*Fy1/(D1−Fy1) and Fy1/Fx1*((D1−Fx1)/(D1−Fy1)) would apply, but in practice large field of view corrections also affect the required focal distances. Together, the combination of the toroidal shapes of the two reflector lenses and their mutual distance are designed to image both at the same final image plane on slit 16, but with different magnification factors. The degree of anamorphotism is the ratio Ay/Ax between these magnification factors Fy1/Fx1*((D1−Fx1)/(D1−Fy1)).

The height, in the z-direction of an ideal toroidal reflector surface is given by $$z=R_y-\sqrt{[R_y-r(x)]^2-y^2} \text{ with } r(x)=R_x-\sqrt{R_x^2-x^2}$$

When Rx=Ry this corresponds to a spherical surface $$z=R_y-\sqrt{R_y^2-x^2-y^2}$$

Figure 2:
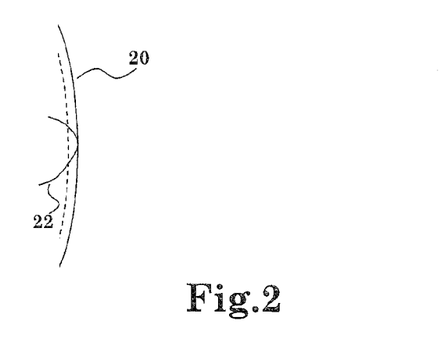
FIG. 2 illustrates toroidal shapes

FIG. 2 illustrates a geometry of a toroidal reflector surface. The geometry may also be defined with the aid of the main symmetry plane (yz plane with x=0), a first circle segment 20 with a circle radius $R_x$ in a first plane (the xz-plane) perpendicular to the main symmetry plane and a second circle segment 22 with a circle radius $R_y$ that lies in the main symmetry plane (the yz plane). A basic toroidal surface corresponds to rotating the first plane, with the circle segment in it, around a line perpendicular to the main symmetry plane at a distance Ry from the first circle segment 20. Thus, the first circle segment 20 is swept along the second circle segment 22 (one first circle segment along the sweep shown by a dashed line by way of example). The first and second circle segment 20, 22 have a second and first radius of curvature Rx, Ry respectively. In the case of a toroidal lens, the radius of curvature Ry, Rx of first and second circle segment are mutually different. Equal radius of curvature Rx=Ry would correspond to a spherical surface.

The actual toroidal shape may be characterized by a quantity called "toricity", which is the deviation Rx/Ry−1 from one of the ratio Rx/Ry between the first and second radius of curvature of second reflector lens 12. (A deviation of zero (Rx/Ry=1) corresponds to a spherical surface. The ratios between the focus distances of the reflector lenses 10, 12 (Fx1/Fy1 and Fx2/Fy2) are proportional to the ratios Rx/Ry of the reflector lenses 10, 12.

Figure 3:
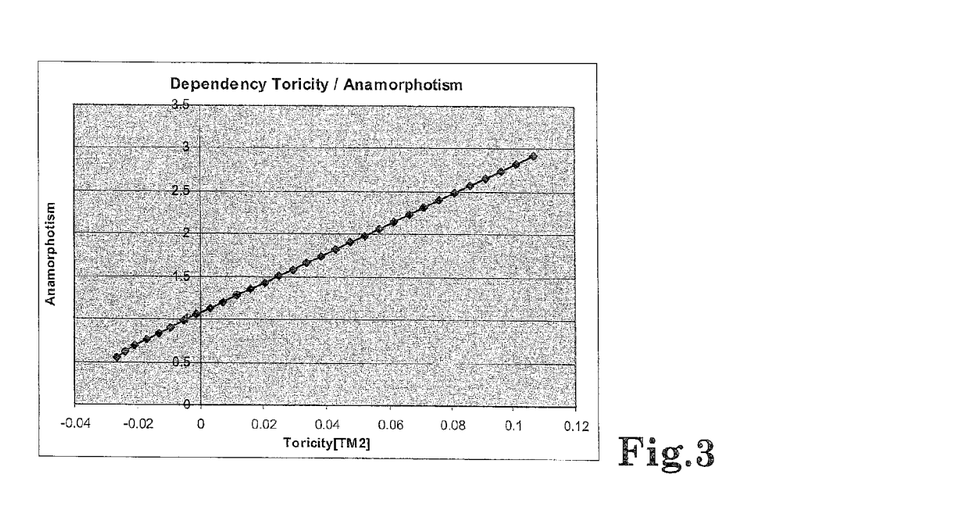
FIG. 3 shows anamorphotism as a function of toricity

FIG. 3 shows the degree anamorphotism as a function of the toricity of second reflector lens 12. The toricity of first reflector lens 10 at the optical axis is a varied as a function of the toricity of second reflector lens 12, as required to realize one image in the image plane. As can be seen a substantially linear relation exists between anamorphotism and toricity of second reflector lens 12, with anamorphotism equal to one (equal magnification factors Ax=Ay substantially for zero toricity (spherical surface).

Asymmetric Reflector Surfaces

In an embodiment a surface of first reflector lens 10 is used that has a deviation from the normal toroidal shape.

Figure 4:
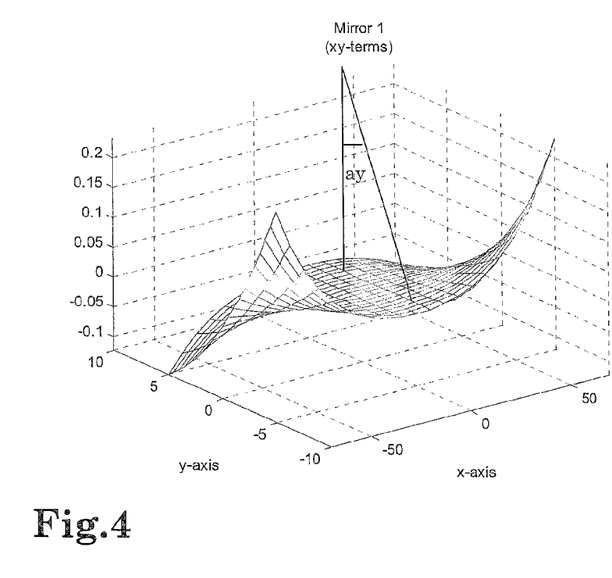
FIG. 4 shows a deviation from a basic toroidal surface

FIG. 4 shows a deviation from the basic toroidal surface that introduces a variable basic radius of curvature Rx of the first circle segment 20, which depends on its position along the second circle segment 22 in the yz-plane. The basic radius of curvature Rx is the radius of curvature at the point of the first circle segment in the main symmetry plane (at x=0). The radius of curvature decreases as a function of position along the y direction when moving away from a point along the direction of the incoming light (between the telescope and the source of the light) towards the optical axis of the telescope (it decreases when moving downward in terms of FIG. 1). Alternatively, the y position dependence of the x-curvature can be expressed as a dependence on the angle "ay" between lines from positions on the surface to the centre of the curvature of the mirror in the y direction, as illustrated symbolically in the figure. The y-dependent variation of the x radius of curvature has a component that is anti-symmetric for mirroring about the xz plane.

This component will be called "torsion". Torsion can be expressed as a coefficient B of a term $Byx^2$ in an expansion of a function that describes a deviation of the surface of first reflector mirror 10 from the shape obtained by sweeping a circle segment of constant radius of curvature Rx in powers of x and y coordinates, as described in the preceding. It should be emphasized that this torsion is an unconventional type of deviation: normally lenses with corrections for aberration are designed to have even symmetry, but torsion introduces an amount of anti-symmetry as a function of y.

The introduction of torsion has been found to have a considerable effect on the quality of the anamorphotic telescope. It has been found that with all corrections a factor of ten reduction of the spot size of the telescope is possible, and moreover, that this reduction persists at viewing angles well beyond the viewing angle at which an increase in spot size sets in the telescope without the corrections. Thus a much larger field of view has been found to be possible. This will be illustrated by examples obtained with such corrections, plus some additional symmetric corrections that will be discussed later.

Figure 5:
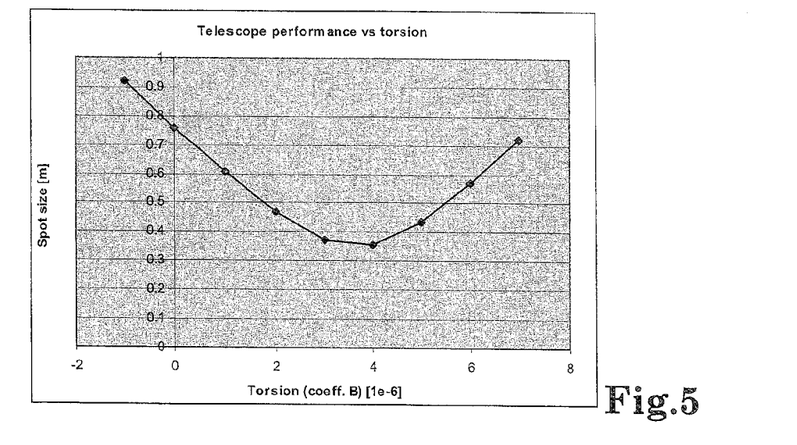
FIG. 5 shows spot size as a function of the degree of torsion

FIG. 5 shows the resulting spot size of the telescope as a function of torsion (as a function of the coefficient B). As can be seen, an optimal (minimum) spot size is realized for a non-zero value of torsion, i.e. when a reflector lens is used that is not perfectly symmetric.

Figure 5A:
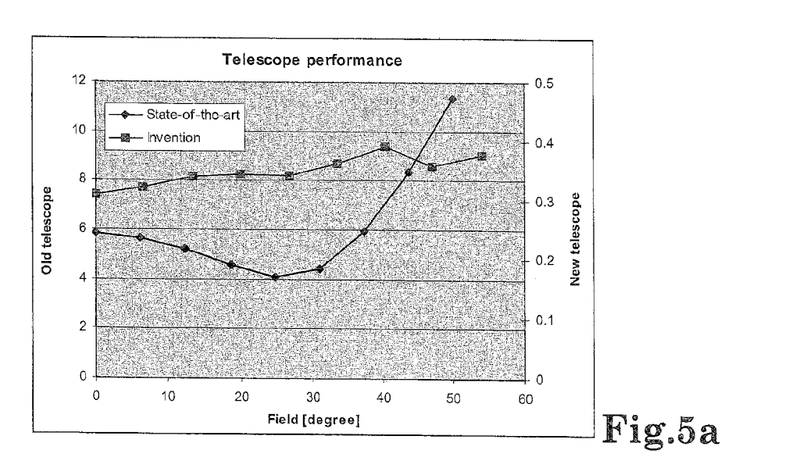
FIG. 5a shows spot size a function of field position

FIG. 5a shows spot size as a function of distance from the centre of the field of view with and without torsion. As can be seen, spot size in the telescope with torsion is not only smaller but it persists over a wider field of view.

Figure 6:
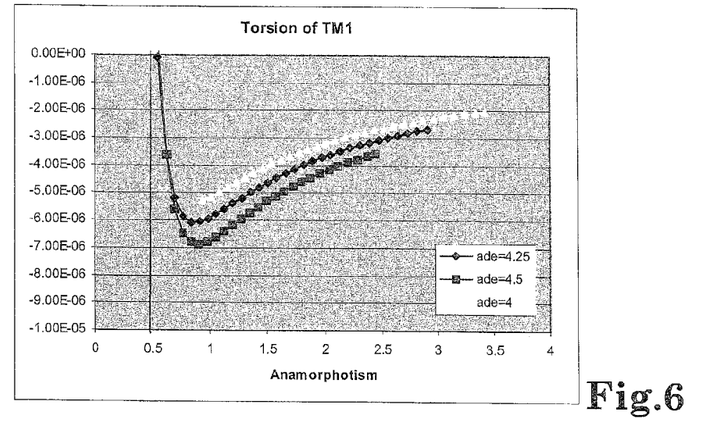
FIG. 6 shows optimal torsion values

FIG. 6 shows optimal values of the degree of torsion B as a function of anamorphotism for various values of the angle of incidence "ade" of the optical axis from the object to first reflector lens 10. As can be seen the size of the optimal degree of torsion B increases with increasing angle. For sufficiently large anamorphotism the size of the degree of torsion B decreases with anamorphotism. However, when anamorphotism is decreased to small values, the size of the degree of torsion B sharply decreases. The turning point value of anamorphotism where this decrease sets in (the extreme of the illustrated curves) depends on the angle of incidence "ade". At increasingly larger angles the turning point value lies at increasingly higher anamorphotism.

Although the figures show results for torsion in a telescope design with specific parameters such as radius of curvature and distance between the first and second reflector mirror, it should be appreciated that similar improvements can be obtained for telescopes with other parameter values, be it at different values of torsion.

The parameters of the telescope include:
(1) the distance D1 between the reflector lenses
(2) the distance D2 from the second reflector lens to the image plane
(3) the angle of incidence (ade) of the ray path along the optical axis relative to the part of that ray path between the first and second reflector lens 10, 12
(4) a second radius of curvature Rx1 of the first reflector lens for object lines oriented along the x direction (in the limit of small distance from on the optical axis)
(5) a second radius of curvature Rx2 of the second reflector lens for object lines oriented along the x direction (in the limit of small distance from on the optical axis)
(6) a ratio Ry1/Rx1 between the radii of curvature of the first reflector lens for object lines along the x and y directions
(7) a ratio Ry2/Rx2 between the radii of curvature of the second reflector lens
(8) the conic constant of the first reflector lens
(9) the conic constant of the second reflector lens
(10) the torsion of the first reflector lens These parameters are not independent. Given a desired magnification of object lines in the x-direction and distances D1, D2, values for the first and second radii of curvature follow automatically. Given the desired amount of anamorphotism Q, i.e. the ratio between magnification of object lines in the x and y directions, the ratios between the radii of curvature in the x and y directions are determined. Moreover, in an embodiment the telescope is telecentric, i.e. an aperture stop is added between first and second reflector lens 10, 12, at a distance to second reflector lens 12 that is equal to a focal distance of second reflector lens 12. The aperture stop limits the angle range of the light that is used to form the image, thereby reducing aberrations.

It has been found that setting torsion dependent on anamorphotism results in a low spot size over a very wide field of view.

FIG. 6 shows the selected value how torsion as a function of anamorphotism to realize an optimal telescope. This dependence may be approximated by the empirical formula $$\text{torsion} = 0.5 * ade * (0.26225 * Q^{-0.05} - 0.27311) Rx1o / (Mx * Ry1^2)$$

Rx1o is a basic radius of curvature value. In an embodiment a telescope with an angle ade of 4.25 degrees and a magnification Mx=0.6 mm per degree is used (in the formula, this should be inserted as mm per degree, i.e. as 180/pi times the value in mm per degree). The radius of curvature in the x direction is approximately.

$$1/Rx1 = 1/Rx1o + 2 * \text{torsion} * ay * Ry1$$

or, writing the torsion explicitly $$1/Rx1 = 1/Rx1o * (1 + ade * ay * (0.26225 * Q^{-0.05} - 0.27311) Rx1o^2 / (Mx * Ry1))$$

Herein "ay" defines the y position in terms of the angle (in radians) between the optical axis between the reflector lenses 10, 12 and a line from the centre of the curvature of the first reflector lens 10 in the y direction to the y-position on first reflector lens 10 for which the radius of curvature Rx1 in the x direction is defined (cf. FIG. 4). "ade" is the angle of incidence, in degrees. In the formula, Mx and My in distance per radian are used. Distances and lengths in Rx1o, Mx and Ry1 should be expressed in the same units (e.g. millimetres). The torsion represents a coefficient of asymmetric deviation from the basic toroidal shape.

It should be emphasized that this formula for the torsion represents an optimum solution: curvature values that lie between a constant curvature value Rx1o and the optimal Rx value may also improve spot size compared to a reflector lens with constant curvature in the x direction. Similarly, curvature values that lie between the optimum value and the constant curvature value Rx1o plus twice the difference between the optimal Rx value and the constant curvature value Rx1o may also improve spot size compared to a reflector lens with constant curvature in the x direction. The empirical formulas approximate the optimum at least up to the angle ade of 4.25 degrees and also for larger angles for example up to five or six degrees.

Further improvement by means of symmetric corrections of the curvature may also be used. An optimal result can be achieved when the radius of curvature of first reflector lens 10 varies $$Rx1o/Rx1 = 1$$
$$+ade*ay*(0.26225*Q^{-0.05}-0.27311)Rx1o^2/(Mx*Ry1)$$
$$+ay^2*(-0.35*Q^2+Q-0.2855)Rx1o/Ry1$$
$$+ay^2*(Ry1^2/Rx1o^2-1)/2$$

As in the case of the term proportional to ay, deviations from the term proportional to $ay^2$ lead to suboptimal results that may still be improvements in a range of values between the radius of curvature obtained when that term is made zero or doubled.

Figure 7:
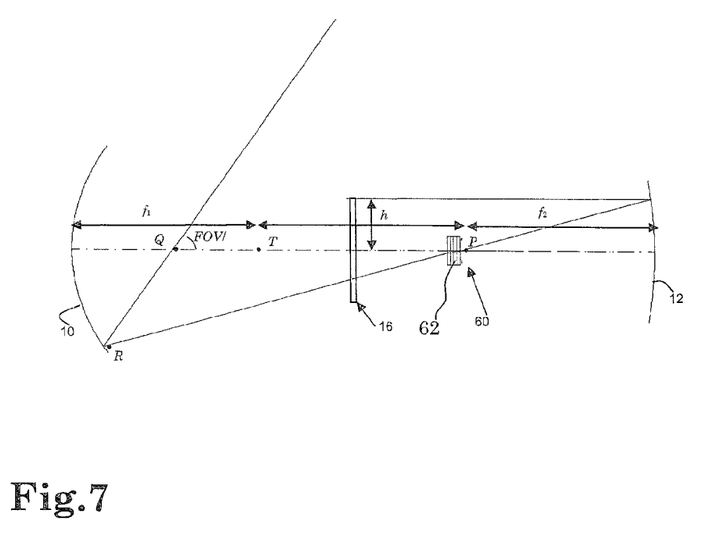
FIG. 7 shows an embodiment of a telescope

FIG. 7 shows the telescope with an additional aperture stop 60, and a polarization scrambler 62. Aperture stop 60 is located between first and second reflector lens 10, 12, at a focal distance Fy2 of second reflector lens 12 from second reflector lens 12. The diameter of aperture stop 60 may be adapted dependent on the maximum acceptable amount of aberration, a larger diameter being used when a higher amount of aberration is tolerated.

It may be recalled that second reflector lens 12 has mutually different focal distances Fx2, Fy2 for the different directions. Aperture stop 60 is preferably located at a distance from second reflector lens 12 that corresponds to one of these focal distances Fy2, i.e. the focal distance for imaging object lines that extend in the x direction. Thus the light at slit 16 is telecentric only when one considers a plane of rays in the yz direction for one value of the (tilted) x coordinate in the image plane. This makes it possible to get improved spectral resolutions with a reduced size spectroscope 18.

Polarization scrambler 62 may be added when the incident light is polarized and it is desirable to make the imaging properties independent of polarization. Polarization scrambler 62 may be located anywhere in the light path, but a location in or adjacent aperture stop 60 has the advantage that the size of polarization scrambler 62 can be minimized. At such a position the diameter of polarization scrambler 62 need not be substantially larger than the diameter of aperture stop 60: it may have the same diameter or the diameter may be less than 10% larger for example.

An embodiment has been described wherein the radius of x-curvature of first reflector lens 10 is adapted anti-symmetrically as a function of the y-coordinate. In this embodiment the curvature of second reflector lens 12 may be symmetric as a function of y coordinate. In other embodiments the curvature of second reflector lens 12 may be adapted anti-symmetrically as well, or only the curvature of second reflector lens 12 may be adapted anti-symmetrically. However, anti-symmetric adaptation of the one of first and second reflector lens 10 that is closest to the intermediate image between first and second reflector lens 10 is preferred. This has the strongest effect in terms of improvement. Typically, in a telescope this closest lens is first reflector lens 10.

A further deviation may be used, wherein the radius of curvature varies in the direction that corresponds to the long direction of the slit symmetrically as a function of position that corresponds to the narrow direction of the slit. With this correction performance can be further optimized.

Correction for Aberrations

In order to correct for various forms of optical aberration, the toroidal surfaces of first reflector lens 10 and second reflector lens 12 may deviate slightly from the ideal toroidal shape corresponding to sweeping a true circle segment 20.

A toroidal surface may be used that deviates from the ideal toroidal surface for large x values. The basic toroidal surface can be described by replacing r(x) in the formula for the ideal toroidal surface by r'(x), with $$r'(x)=[R_x-\text{sqrt}(R_x^2-(1+k)*x^2)]/(1+k)$$

This can be rewritten as $$r'(x)=c^2x^2/[1+\text{sqrt}(1-(1+k)*c^2*x^2)]$$

Herein $c=1/R_x$ and the parameter k is a measure of the deviation from the ideal toroidal surface.

The parameter k corresponds to a deviation in a fourth order coefficient of an expansion of the r'(x) function in powers of x, from the fourth order coefficient corresponding to a true circle segment. This measure of deviation will be called the conic constant.

Figure 8:
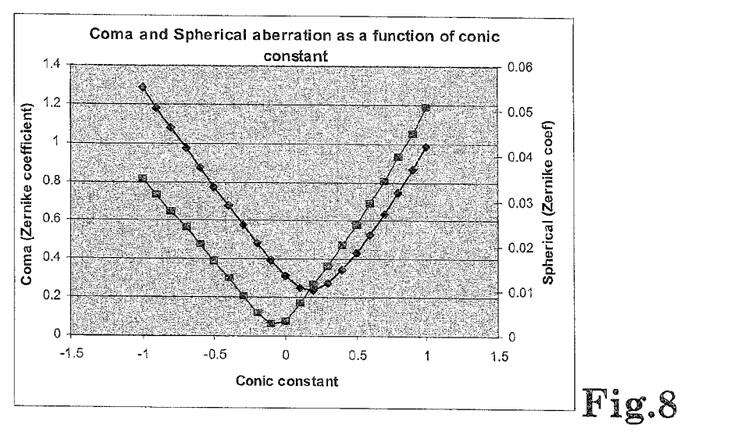
FIG. 8 shows spherical aberration and coma as a function of curvature variation

FIG. 8 shows measures of two forms of aberrations (spherical aberration and coma) as a function of the conic constant. As can be seen both aberrations can be minimized nearly simultaneously by varying the change of radius of curvature.

An anamorphotic telescope is provided, having mutually different magnification along directions of minimum and maximum magnification in an image plane, the anamorphotic telescope comprising a first and second reflector lens, the first reflector lens being oriented to direct light from a view direction of the telescope to the second reflector lens at an angle to the view direction, the second reflector lens being oriented to reflect light form the first reflector lens to the image plane, each of the first and second reflector lens comprising a reflective surface having a shape with mutually different first and second radii of curvature in first and second directions (y, x) that optically correspond different ones of the directions of minimum and maximum magnification in the image plane respectively, wherein at least one of the first and second reflector lens has a variable radius of curvature in the second direction (x), which varies as a function of position in the first direction (y), the variable radius of curvature decreasing in a direction of the angle from the view direction to the light directed by the first reflector lens to the second reflector lens.

The invention claimed is:

1. An anamorphotic telescope, having mutually different magnification along directions of minimum and maximum magnification in an image plane, the anamorphotic telescope comprising a first and second reflector lens, the first reflector lens being oriented to direct light from a view direction of the telescope to the second reflector lens at an angle to the view direction, the second reflector lens being oriented to reflect light from the first reflector lens to the image plane, each of the first and second reflector lens comprising a reflective surface having a shape with mutually different first and second radii of curvature in first and second directions (y, x) that optically correspond to different ones of the directions of minimum and maximum magnification in the image plane respectively, wherein at least one of the first and second reflector lens has a variable radius of curvature in the second direction (x), which varies as a function of position in the first direction (y), the variable radius of curvature decreasing continually over said at least one of the first and second reflector lens in the direction of a first direction component of displacement from points along the view direction to points along a path of the light directed by the first reflector lens to the second reflector lens.

2. An anamorphotic telescope according to claim 1, comprising a spectrometer with an elongated opening slit located in the image plane, the spectrometer being configured to resolve respective spectra at different positions along a direction of longest extent of the slit respectively, the direction of longest extent being aligned along the one of the directions of minimum and maximum magnification that corresponds to the second direction.

3. An anamorphotic telescope according to claim 2, wherein the direction of longest extent is aligned along the direction of minimum magnification.

4. An anamorphotic telescope according to claim 2, wherein a deviation between the view direction and an optical axis of between the first and second reflector lens is aligned with the first direction.

5. An anamorphotic telescope according to claim 1, wherein the variable radius of curvature has a component of variation that is anti-symmetric under mirroring with respect to a symmetry plane containing the second direction and the optical axis between the first and second reflector lens, the anti-symmetric variation of an inverse of the second radius of curvature of the at least one of the first and second reflector lens lying in a range between a value $$1/Rxo \text{ and } 1/Rxo*(1 +2*ade*ay*(0.26225*Q^{-0.05}-0.27311)Rxo^2/(Mx*Ry))$$

wherein Q is a ratio between magnifications Mx and My of the anamorphotic telescope in the second and first directions defined as distance in the image plane per radian object direction difference, Rxo is a basic constant radius of curvature necessary for imaging in the image plane, Ry is the radius of curvature in the first direction, "ade" is the angle of the direction of incidence and ay is an angle between the optical axis between the first and second reflector lens and a line from a centre of the curvature of the at least one of the first and second reflector lens in the first direction and a point on the first reflector lens for which the radius of curvature is defined.

6. An anamorphotic telescope according to claim 5, wherein the anti-symmetric variation of an inverse of the second radius of curvature of the at least one of the first and second reflector lens lying varies according to $$1/Rxo*(1+ade*ay*(0.26225*Q^{-0.05}-0.27311)Rxo^2/(Mx*Ry)).$$

7. An anamorphotic telescope according to claim 1 wherein the second radius of curvature varies with position at least in that one of the first and second reflector lens that is closest to virtual images formed between the first and second reflector lens.

8. An anamorphotic telescope according to claim 1, comprising an aperture stop located between the first and second reflector lens at a distance from the second reflector lens that equals a focus distance of the second reflector lens for object lines that extend along the direction.

9. An anamorphotic telescope according to claim 1, comprising a spectrometer configured to receive light from the second reflector lens through an elongated slit with a longest direction extending in the second direction.

10. An anamorphotic telescope according to claim 5, wherein a first magnification in the first direction is larger than a second magnification in the second direction.

11. An anamorphotic telescope according to claim 7, wherein a ratio between the maximum and minimum magnification is at least 1.2.

12. An anamorphotic telescope according to claim 1, comprising a polarization scrambler located between the first and second reflector lens.

13. An anamorphotic telescope according to claim 1, wherein the first and second reflector lens are relatively oriented so that an optical path through the telescope from the view direction to the first reflector lens, from the first reflector lens to the second reflector lens and from the second reflector lens to the image plane is entirely perpendicular to said second direction (x).

14. A method of imaging an object, comprising viewing the object with the anamorphotic telescope according to claim 1, and moving the anamorphotic telescope in a direction perpendicular to said second direction (x) during imaging.

15. An anamorphotic telescope, having mutually different magnification along directions of minimum and maximum magnification in an image plane, the anamorphotic telescope comprising a first and second reflector lens, the first reflector lens being oriented to direct light from a view direction of the telescope to the second reflector lens at an angle to the view direction, the second reflector lens being oriented to reflect light from the first reflector lens to the image plane, each of the first and second reflector lens comprising a reflective surface having a shape with mutually different first and second radii of curvature in first and second directions (y, x) that optically correspond to the directions of minimum and maximum magnification in the image plane respectively, wherein at least one of the first and second reflector lens has a variable radius of curvature in the second direction (x) that only decreases in the direction of a first direction component of displacement from points along the view direction to points along a path of the light directed by the first reflector lens to the second reflector lens.

* * * * *